(12) United States Patent
Tahara et al.

(10) Patent No.: US 9,023,119 B2
(45) Date of Patent: May 5, 2015

(54) ELECTROLYTIC MANGANESE DIOXIDE FOR LITHIUM PRIMARY BATTERY, MANUFACTURING METHOD THEREFOR, AND LITHIUM PRIMARY BATTERY USING SAME

(75) Inventors: Shinichiro Tahara, Osaka (JP); Yasuhiro Suzuki, Kyoto (JP); Toshiyuki Shimizu, Osaka (JP)

(73) Assignee: Panasonic Intellectual Property Management Co., Ltd., Osaka (JP)

( * ) Notice: Subject to any disclaimer, the term of this patent is extended or adjusted under 35 U.S.C. 154(b) by 888 days.

(21) Appl. No.: 12/681,500

(22) PCT Filed: Jul. 6, 2009

(86) PCT No.: PCT/JP2009/003122
§ 371 (c)(1),
(2), (4) Date: Apr. 2, 2010

(87) PCT Pub. No.: WO2010/004718
PCT Pub. Date: Jan. 14, 2010

(65) Prior Publication Data
US 2010/0239911 A1    Sep. 23, 2010

(30) Foreign Application Priority Data

Jul. 9, 2008  (JP) ................................. 2008-178819

(51) Int. Cl.
| | |
|---|---|
| *H01M 6/00* | (2006.01) |
| *H01M 6/16* | (2006.01) |
| *H01M 4/131* | (2010.01) |
| *H01M 4/1391* | (2010.01) |
| *H01M 4/505* | (2010.01) |

(52) U.S. Cl.
CPC ................ *H01M 6/16* (2013.01); *H01M 4/131* (2013.01); *H01M 4/1391* (2013.01); *H01M 4/505* (2013.01); *Y02E 60/122* (2013.01)

(58) Field of Classification Search
USPC ................... 429/231.1, 224, 218.1; 29/623.1; 205/539; 423/605
See application file for complete search history.

(56) References Cited

U.S. PATENT DOCUMENTS

| | | |
|---|---|---|
| 5,698,176 A | 12/1997 | Capparella et al. |
| 5,863,675 A | 1/1999 | Capparella et al. |
| 2001/0024752 A1 | 9/2001 | Sumida et al. |
| 2003/0091900 A1* | 5/2003 | Numata et al. ................. 429/224 |
| 2003/0211392 A1 | 11/2003 | Nanjundaswamy et al. |
| 2008/0171266 A1* | 7/2008 | Kato et al. .................... 429/303 |

FOREIGN PATENT DOCUMENTS

| | | |
|---|---|---|
| JP | 11-506721 | 6/1999 |
| JP | 2001-026425 | 1/2001 |
| JP | 2001-026425 A | 1/2001 |
| JP | 2001-236957 | 8/2001 |
| JP | 2004-273169 | 9/2004 |
| JP | 2004-273169 A | 9/2004 |
| JP | 2005-524947 | 8/2005 |
| JP | 2007-012599 | 1/2007 |
| JP | 2007-012599 A | 1/2007 |
| WO | WO 96/40588 | 12/1996 |
| WO | WO 03/096442 A3 | 11/2003 |

* cited by examiner

*Primary Examiner* — Raymond Alejandro
(74) *Attorney, Agent, or Firm* — McDermott Will & Emery LLP

(57) ABSTRACT

Electrolytic manganese dioxide for lithium primary batteries has a sodium content of 0.05 to 0.2% by mass, and a pH of 5 to 7 as measured according to JIS-K-1467. Using this electrolytic manganese dioxide as a positive electrode active material for lithium primary batteries enables the batteries to be excellent in both initial discharge characteristics and long-term discharge characteristics.

9 Claims, 1 Drawing Sheet

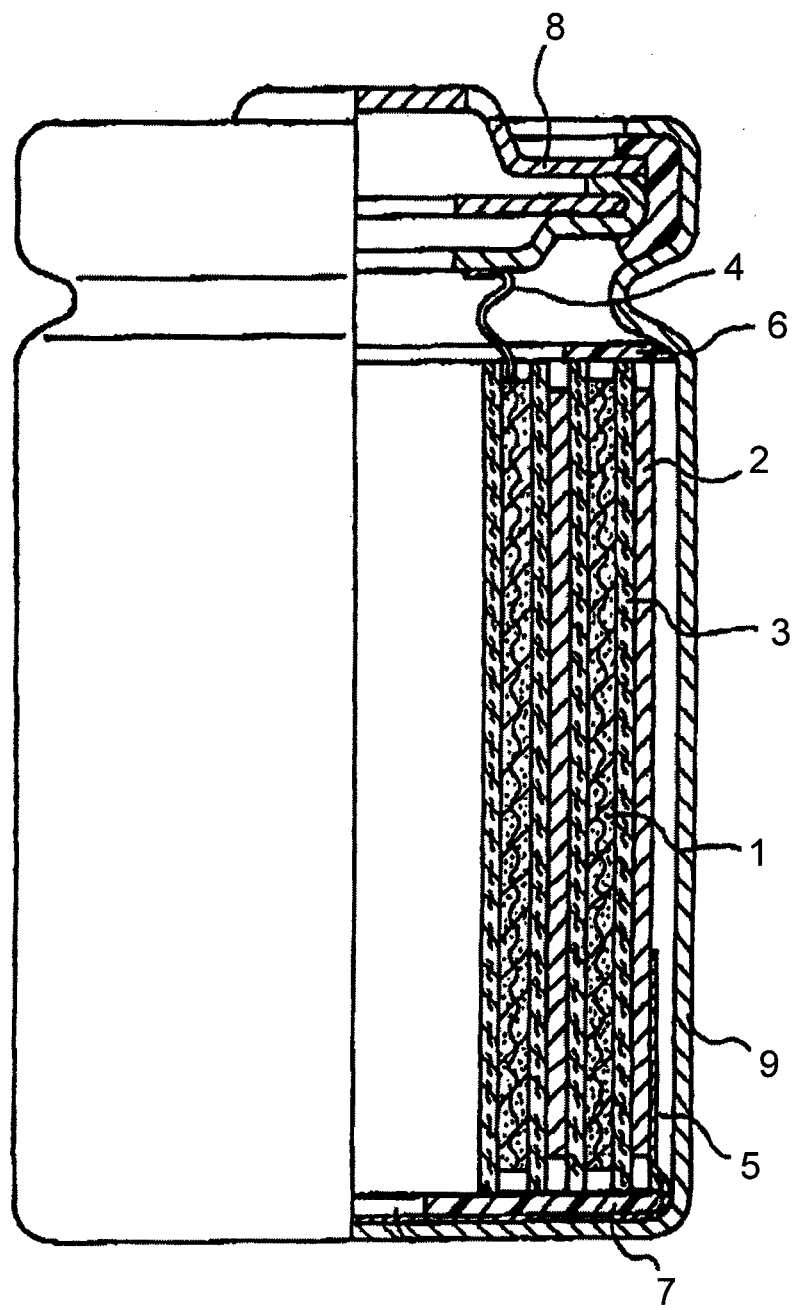

ELECTROLYTIC MANGANESE DIOXIDE FOR LITHIUM PRIMARY BATTERY, MANUFACTURING METHOD THEREFOR, AND LITHIUM PRIMARY BATTERY USING SAME

RELATED APPLICATIONS

This application is the U.S. National Phase under 35 U.S.C. §371 of International Application No. PCT/JP2009/003122, filed on Jul. 6, 2009, which in turn claims the benefit of Japanese Application No. 2008-178819, filed on Jul. 9, 2008, the disclosures of which Applications are incorporated by reference herein.

TECHNICAL FIELD

The present invention relates to electrolytic manganese dioxide for lithium primary batteries, manufacturing method therefor, and a lithium primary battery using the same as a positive electrode active material.

BACKGROUND ART

Lithium primary batteries use lithium and other light metals as a negative electrode active material, and manganese dioxide or graphite fluoride as a positive electrode active material. These batteries have unique features including high voltage, high energy density, low self-discharge, and an extremely long storage life, and hence are used in various electronic devices.

Among the materials used as a positive electrode active material, manganese dioxide is very popular because it is inexpensive and abundant, and as a positive electrode active material for lithium primary batteries, electrolytic manganese dioxide is commonly used due to its excellent discharge performance and long-term storage performance.

Electrolytic manganese dioxide is generally electrolytically synthesized in a sulphuric acid solution containing manganese ions, and therefore, is required to be neutralized with alkali when used as a positive electrode active material for lithium primary batteries. Popular examples of the alkali used for neutralization are ammonia and sodium hydroxide.

Electrolytic manganese dioxide prepared by neutralization with ammonia (hereinafter, ammonia-neutralized product) is widely used for lithium primary batteries. The ammonia-neutralized product, however, is manufactured by only a few manufacturers, and therefore, is less available and more expensive than electrolytic manganese dioxide prepared by neutralization with sodium hydroxide (hereinafter, sodium-neutralized product). As another disadvantage, when used as a positive electrode active material for lithium primary batteries, the ammonia-neutralized product requires a dedicated exhaust system to ensure working conditions because it causes ammonia to volatize, giving off a pungent smell when heat-treated to remove moisture.

The sodium-neutralized product, on the other hand, is mainly used as a positive electrode active material for dry batteries. The sodium-neutralized product generally contains 0.3 to 0.5% by mass of sodium, which may reduce the discharge performance when used for lithium primary batteries. The reason for the reduction is that the sodium in the sodium-neutralized product is deposited on the lithium used as a negative electrode active material and forms a resistance film thereon. The deposition is more significant as the battery is stored at a higher temperature and for a longer period. This is why the sodium-neutralized product is little used as a positive electrode active material for lithium primary batteries although it is easily available.

The sodium-neutralized product, however, is inexpensive and mass-produced, and therefore, it is a valuable attempt from an industrial viewpoint to make full use of this product as electrolytic manganese dioxide for lithium primary batteries.

To achieve this attempt, it has been suggested that electrolytic manganese dioxide is sodium-neutralized in such a manner that the neutralized electrolytic manganese dioxide has a minimum sodium content in the range of 0.05 to 0.2% by mass (Patent Literature 1, for example).

The sodium-neutralized product having a minimum sodium content, however, contains a large amount of sulfuric acid residues, making its pH as low as 2 to 4. When sintered and used as a positive electrode active material for lithium primary batteries, such a sodium-neutralized product with a low pH increases the battery internal resistance when a weak discharge is continued for a long time such as over one year, although its initial discharge performance is excellent.

Patent Literature 1: Japanese Patent Unexamined Publication No. 2001-236957

SUMMARY OF THE INVENTION

The present invention relates to electrolytic manganese dioxide for lithium primary batteries prepared from a sodium-neutralized product. The invention has an object of providing electrolytic manganese dioxide that offers both excellent initial discharge characteristics and excellent long-term discharge performance when used for a lithium primary battery, a method for producing the electrolytic manganese dioxide, and a lithium primary battery using the electrolytic manganese dioxide as a positive electrode active material, thereby being excellent in long-term discharge performance.

The electrolytic manganese dioxide for lithium primary batteries according to the present invention has a sodium content of 0.05 to 0.2% by mass, and a pH of 5 to 7 as measured according to JIS-K-1467. The lithium primary battery using the electrolytic manganese dioxide according to the present invention as a positive electrode active material can reduce an increase in the battery internal resistance even when a weak discharge is continued for a long time such as over one year.

The method for producing the electrolytic manganese dioxide for lithium primary batteries according to the present invention includes preparing neutralized electrolytic manganese dioxide by neutralizing electrolytic manganese dioxide with sodium hydroxide, the electrolytic manganese dioxide being electrosynthesized in an acid electrolytic bath; and washing the neutralized electrolytic manganese dioxide with water in such a manner that water-washed electrolytic manganese dioxide has a sodium content of 0.05 to 0.2% by mass, and a pH of 5 to 7 as measured according to JIS-K-1467.

The lithium primary battery according to the present invention uses, as a positive electrode active material, electrolytic manganese dioxide having a sodium content of 0.05 to 0.2% by mass, and a pH of 5 to 7 as measured according to JIS-K-1467. Using this electrolytic manganese dioxide can reduce the formation of a resistance film containing sodium or manganese on the negative electrode, enabling the lithium primary battery to be excellent in both initial discharge performance and long-term discharge performance.

BRIEF DESCRIPTION OF THE DRAWING

FIG. 1 is a schematic sectional view of a lithium primary battery according to an embodiment of the present invention.

DETAILED DESCRIPTION OF PREFERRED EMBODIMENT

The following is a description of an embodiment of the present invention. Note that the following embodiment is one example of the present invention, and does not limit the technical scope of the invention.

The sodium content of the electrolytic manganese dioxide for lithium primary batteries is measured by ICP analysis. In the case of producing a lithium primary battery using the electrolytic manganese dioxide prepared from a sodium-neutralized product as a positive electrode active material, sodium elutes from the electrolytic manganese dioxide when its sodium content is larger than 0.2% by mass. The eluted sodium is deposited on the lithium used as the negative electrode active material and forms a resistance film thereon, reducing the battery discharge performance. When the electrolytic manganese dioxide has a pH of less than 5 as measured according to JIS-K-1467, sulfuric acid components remaining in the electrolytic manganese dioxide react with the small amount of water in the battery and generate an acid, causing manganese ions to elute from the electrolytic manganese dioxide during a long discharge. The eluted manganese ions are deposited on the lithium used as the negative electrode active material and form resistance film thereon, causing an increase in battery internal resistance.

Note that it is impossible to produce electrolytic manganese dioxide having a pH greater than 7 and a sodium content of 0.05 to 0.2% by mass by means of electrolyzing it in an acid electrolytic bath and then sodium-neutralizing it.

Also note that when the sodium content of the sodium-neutralized product is less than 0.05% by mass, it is difficult to have a pH of 5 or greater by an after-mentioned washing treatment with water.

The following is a brief description of the pH measurement method specified in JIS-K-1467. First, 15 g of manganese dioxide as a sample is put in a 200 ml Erlenmeyer flask, and 75 ml of a 20% aqueous $NH_4Cl$ solution is added thereto so as to prepare a sample solution. The aqueous $NH_4Cl$ solution contains 100 ml of water and 20 g of $NH_4Cl$ dissolved therein. Next, the sample solution is stirred with a magnetic stirrer for 30 minutes. The stirring is performed at a rate that does not cause the solution to spatter in the flask. After the stirring, the flask is left for five to ten minutes at an inclination angle of 30 degrees. Then, 50 ml of the supernatant solution is collected and measured for its pH by a digital pH meter or the like. The obtained value is considered to be the pH of the manganese dioxide.

The following is a description of a method for measuring a sodium content by ICP analysis. First, 1 g of manganese dioxide as a sample is put in a 200 ml beaker, and 20 ml of hydrochloric acid (a 50% by volume aqueous solution) is added thereto. The resulting solution is heated until the manganese dioxide is dissolved, and then cooled. The cooled solution is filtered, and pure water is added thereto so as to make 100 ml of the solution. The resulting solution is subjected to standard addition method using an atomic absorption spectrometer so as to determine the quantity of sodium.

The following is a description of a method for producing the electrolytic manganese dioxide for lithium primary batteries according to the embodiment.

First, electrolytic manganese dioxide is prepared which is electrosynthesized in an acid electrolytic bath containing a sulphuric acid solution. Then, the electrolytic manganese dioxide is neutralized with aqueous sodium hydroxide so as to prepare neutralized electrolytic manganese dioxide. The neutralization is performed using aqueous sodium hydroxide that contains 2.0 to 10.0 g of sodium hydroxide per 1 kg of electrolytic manganese dioxide. As a result, the neutralized electrolytic manganese dioxide has a sodium content of 0.05 to 0.5% by mass. The neutralized electrolytic manganese dioxide thus obtained generally has a pH of 2 to 4 as measured according to JIS-K-1467.

Next, the neutralized electrolytic manganese dioxide is stirred and washed with water, centrifuged to remove water, and dried, thus preparing water-washed electrolytic manganese dioxide. The washing is performed in such a manner that the water-washed electrolytic manganese dioxide has a sodium content of 0.05 to 0.2% by mass, and a pH of 5 to 7 as measured according to JIS-K-1467.

When a large amount of sodium hydroxide is used for the neutralization, and as a result, the sodium content of the neutralized electrolytic manganese dioxide is 0.4 to 0.5% by mass, a large amount of water is required for washing to make the sodium content of the water-washed electrolytic manganese dioxide 0.2% by mass or less. In the contrary, when a small amount of sodium hydroxide is used for the neutralization, and as a result, the sodium content of the neutralized electrolytic manganese dioxide is 0.05% by mass or more and less than 0.1% by mass, the neutralized electrolytic manganese dioxide has a low pH. In this case, a large amount of water is required to wash out sulfuric acid components and to make the water-washed electrolytic manganese dioxide have a pH of 5 or greater. Therefore, to save water for the washing, the sodium content of the neutralized electrolytic manganese dioxide is preferably 0.1 to 0.4% by mass.

In general, when manganese dioxide is used as a positive electrode active material for lithium primary batteries, it is necessary to remove the water in the crystal of the manganese dioxide by a heat treatment at 300° C. or above. In the method for producing electrolytic manganese dioxide for lithium primary batteries according to the present invention, the heat treatment can be performed either before or after washing because it does not change the sodium content or the pH of the electrolytic manganese dioxide or affect the battery characteristics.

A lithium primary battery shown in FIG. 1 is produced using as a positive electrode active material the electrolytic manganese dioxide prepared as described above. FIG. 1 is a schematic sectional view of the lithium primary battery according to the embodiment of the present invention.

This lithium primary battery includes positive electrode 1 containing the above-described electrolytic manganese dioxide as an active material, and negative electrode 2 containing lithium as an active material. Positive electrode 1 and negative electrode 2 are spirally wound together with separator 3 therebetween so as to form an electrode assembly. The electrode assembly is put into case 9 together with a non-aqueous electrolytic solution (not shown). Case 9 has an opening sealed with sealing plate 8, which is joined to lead 4 connected to the core sheet of positive electrode 1. Case 9 is also joined to lead 5 connected to negative electrode 2. The electrode assembly is provided with upper insulating plate 6 and lower insulating plate 7 for internal short circuit protection.

Positive electrode 1 is produced as follows. The electrolytic manganese dioxide prepared by neutralization and washing with water as described above is mixed with a conductive agent, added with a binder and water, and then kneaded together to prepare a positive-electrode mixture. The conductive agent can be graphite powder such as artificial graphite or natural graphite, or a mixture of graphite powder and carbon black such as acetylene black. The amount of the conductive agent to be used can be large enough to fully inject the electrolytic manganese dioxide and to form a conductive path so as to reduce the electric resistance of positive electrode 1. In particular, it is preferable that the conductive agent contains 4 to 8 parts by weight of graphite per 100 parts by weight of the electrolytic manganese dioxide. Next, the positive-electrode mixture is injected into a core sheet having a mesh structure or fine pores such as an expanded metal, a net, or a perforated metal, then rolled, and cut in size. Then, part of the positive-electrode mixture is peeled off to which lead 4 is welded, thereby producing belt-shaped positive electrode 1.

Negative electrode 2, on the other hand, which is also belt-shaped, is composed of metallic lithium or a lithium alloy such as Li—Al, Li—Sn, Li—NiSi, or Li—Pb.

The solvent of the non-aqueous electrolytic solution is not particularly limited as long as it is an organic solvent generally used in a non-aqueous electrolytic solution for lithium batteries. More specifically, it is possible to use γ-butyrolactone, propylene carbonate, ethylene carbonate, or 1,2-dimethoxyethane either alone or in combination.

The non-aqueous electrolytic solution contains a supporting electrolyte, which can be lithium tetrafluoroborate, lithium phosphorus hexafluoride, lithium trifluoromethanesulfonate, or $LiN(CF_3SO_2)_2$, $LiN(C_2F_5SO_2)_2$, or $LiN(CF_3SO_2)(C_4F_9SO_2)$ having an imide bond in the molecular structure.

Separator 3 can be made of a woven or nonwoven polyolefin cloth, a microporous film, or the like.

The effect of the embodiment will be described in specific examples below. The electrolytic manganese dioxide, which has been prepared by electrolyzation in a sulfuric acid bath is neutralized by adjusting the concentration in the aqueous sodium hydroxide to contain 3.0 g of sodium hydroxide per 1 kg of the electrolytic manganese dioxide. The neutralized electrolytic manganese dioxide has a sodium content of 0.10% by mass. The neutralized electrolytic manganese dioxide is filtered, dried, and heat-treated at 400° C. for four hours. Then, the heat-treated electrolytic manganese dioxide is stirred and washed with water which is added in a ratio of 10 kg per 1 kg of the heat-treated electrolytic manganese dioxide. After the washing with water, the electrolytic manganese dioxide is centrifuged to remove water, and dried, thus preparing water-washed electrolytic manganese dioxide having a sodium content of 0.05% by mass, and a pH of 5.0 as measured according to JIS-K-1467.

To be used as a positive electrode active material, the water-washed electrolytic manganese dioxide is added with 5% by mass of graphite as a conductive agent, and 2% by mass of polytetrafluoroethylene as a binder. Then, the resulting mixture is kneaded together with 35% by mass of pure water so as to prepare a wet positive-electrode mixture. The wet positive-electrode mixture and a 0.1 mm thick stainless expanded metal are fed together between two rotating rollers rotating at the same speed so as to inject the positive-electrode mixture into the expanded metal, thereby producing a mixture sheet. The mixture sheet is dried, rolled by a roller press, and cut in size (0.40 mm in thickness, 26 mm in width, and 235 mm in length), thereby preparing positive electrode 1.

Negative electrode 2 is a lithium metal plate, which is cut in size (0.18 mm in thickness, 24 mm in width, and 260 mm in length). Positive electrode 1 and negative electrode 2 thus prepared are spirally wound together with the separator made of a microporous polyethylene film, thus forming the electrode assembly. The electrode assembly is put into case 9.

Next, stainless lead 4 connected to the core sheet of positive electrode 1 is connected to the positive terminal of sealing plate 8, and nickel lead 5 connected to negative electrode 2 is connected to case 9. Then, the unillustrated non-aqueous electrolytic solution is injected into case 9, and the opening of case 9 is sealed. As a result, a cylindrical manganese dioxide lithium primary battery shown in FIG. 1 is obtained which has a diameter of 17 mm and a height of 33.5 mm. Ten such batteries are produced. The non-aqueous electrolytic solution is prepared by dissolving lithium trifluoromethanesulfonate as a supporting electrolyte at a concentration of 0.5 mol/L in a non-aqueous solvent. The non-aqueous solvent is a mixed solvent of propylene carbonate and dimethoxyethane in a volume ratio of 1:1. The manganese dioxide lithium primary batteries thus produced are referred to as batteries "A".

The electrolytic manganese dioxide, which has been prepared by electrolyzation in a sulfuric acid bath is neutralized by adjusting the concentration in the aqueous sodium hydroxide to contain 7.0 g of sodium hydroxide per 1 kg of the electrolytic manganese dioxide. The neutralized electrolytic manganese dioxide has a sodium content of 0.30% by mass. The neutralized electrolytic manganese dioxide is filtered, dried, and heat-treated at 400° C. for four hours. Then, the heat-treated electrolytic manganese dioxide is stirred and washed with water which is added in a ratio of 10 kg per 1 kg of the heat-treated electrolytic manganese dioxide. After the washing with water, the electrolytic manganese dioxide is centrifuged to remove water, and dried, thus preparing water-washed electrolytic manganese dioxide having a sodium content of 0.20% by mass, and a pH of 5.0 as measured according to JIS-K-1467. Batteries "B" are produced using the water-washed electrolytic manganese dioxide thus obtained, but otherwise in the same manner as batteries "A".

The electrolytic manganese dioxide, which has been prepared by electrolyzation in a sulfuric acid bath is neutralized by adjusting the concentration in the aqueous sodium hydroxide to contain 9.0 g of sodium hydroxide per 1 kg of the electrolytic manganese dioxide. The neutralized electrolytic manganese dioxide has a sodium content of 0.40% by mass. The neutralized electrolytic manganese dioxide is filtered, dried, and heat-treated at 400° C. for four hours. Then, the heat-treated electrolytic manganese dioxide is stirred and washed with water which is added in a ratio of 20 kg per 1 kg of the heat-treated electrolytic manganese dioxide. After the washing with water, the electrolytic manganese dioxide is centrifuged to remove water, and dried, thus preparing water-washed electrolytic manganese dioxide having a sodium content of 0.20% by mass, and a pH of 7.0 as measured according to JIS-K-1467. Batteries "C" are produced using the water-washed electrolytic manganese dioxide thus obtained, but otherwise in the same manner as batteries "A".

The electrolytic manganese dioxide, which has been prepared by electrolyzation in a sulfuric acid bath is neutralized by adjusting the concentration in the aqueous sodium hydroxide to contain 4.0 g of sodium hydroxide per 1 kg of the electrolytic manganese dioxide. The neutralized electrolytic manganese dioxide has a sodium content of 0.15% by mass. The neutralized electrolytic manganese dioxide is filtered, dried, and heat-treated at 400° C. for four hours. Then, the heat-treated electrolytic manganese dioxide is stirred and washed with water which is added in a ratio of 20 kg per 1 kg of the heat-treated electrolytic manganese dioxide. After the washing with water, the electrolytic manganese dioxide is centrifuged to remove water, and dried, thus preparing water-washed electrolytic manganese dioxide having a sodium content of 0.05% by mass, and a pH of 7.0 as measured according to JIS-K-1467. Batteries "D" are produced using the water-washed electrolytic manganese dioxide thus obtained, but otherwise in the same manner as batteries "A".

The electrolytic manganese dioxide, which has been prepared by electrolyzation in a sulfuric acid bath is neutralized by adjusting the concentration in the aqueous sodium hydroxide to contain 5.0 g of sodium hydroxide per 1 kg of the electrolytic manganese dioxide. The neutralized electrolytic manganese dioxide has a sodium content of 0.20% by mass. The neutralized electrolytic manganese dioxide is filtered, dried, and heat-treated at 400° C. for four hours. Then, the heat-treated electrolytic manganese dioxide is stirred and washed with water which is added in a ratio of 10 kg per 1 kg of the heat-treated electrolytic manganese dioxide. After the washing with water, the electrolytic manganese dioxide is centrifuged to remove water, and dried, thus preparing water-washed electrolytic manganese dioxide having a sodium content of 0.10% by mass, and a pH of 6.0 as measured according to JIS-K-1467. Batteries "E" are produced using the water-washed electrolytic manganese dioxide thus obtained, but otherwise in the same manner as batteries "A".

The electrolytic manganese dioxide, which has been prepared by electrolyzation in a sulfuric acid bath is neutralized by adjusting the concentration in the aqueous sodium hydroxide to contain 9.0 g of sodium hydroxide per 1 kg of the electrolytic manganese dioxide. The neutralized electrolytic manganese dioxide has a sodium content of 0.40% by mass. The neutralized electrolytic manganese dioxide is filtered, dried, and heat-treated at 400° C. for four hours. Then the heat-treated electrolytic manganese dioxide is stirred and washed with water which is added in a ratio of 10 kg per 1 kg of the heat-treated electrolytic manganese dioxide. After the washing with water, the electrolytic manganese dioxide is centrifuged to remove water, and dried, thus preparing water-washed electrolytic manganese dioxide having a sodium content of 0.25% by mass, and a pH of 6.0 as measured according to JIS-K-1467. Batteries "F" are produced using the water-washed electrolytic manganese dioxide thus obtained, but otherwise in the same manner as batteries "A".

The electrolytic manganese dioxide, which has been prepared by electrolyzation in a sulfuric acid bath is neutralized by adjusting the concentration in the aqueous sodium hydroxide to contain 5.0 g of sodium hydroxide per 1 kg of the electrolytic manganese dioxide. The neutralized electrolytic manganese dioxide has a sodium content of 0.15% by mass. The neutralized electrolytic manganese dioxide is filtered, dried, and heat-treated at 400° C. for four hours. Then, the heat-treated electrolytic manganese dioxide is stirred and washed with water which is added in a ratio of 5 kg per 1 kg of the heat-treated electrolytic manganese dioxide. After the washing with water, the electrolytic manganese dioxide is centrifuged to remove water, and dried, thus preparing water-washed electrolytic manganese dioxide having a sodium content of 0.10% by mass, and a pH of 4.5 as measured according to JIS-K-1467. Batteries "G" are produced using the water-washed electrolytic manganese dioxide thus obtained, but otherwise in the same manner as batteries "A".

The electrolytic manganese dioxide, which has been prepared by electrolyzation in a sulfuric acid bath is neutralized by adjusting the concentration in the aqueous sodium hydroxide to contain 5.0 g of sodium hydroxide per 1 kg of the electrolytic manganese dioxide. The neutralized electrolytic manganese dioxide has a sodium content of 0.20% by mass. The neutralized electrolytic manganese dioxide is filtered, dried, and heat-treated at 400° C. for four hours. The heat-treated electrolytic manganese dioxide has a pH of 4.5 as measured according to JIS-K-1467. Batteries "H" are produced using the heat-treated electrolytic manganese dioxide without being washed with water, but otherwise in the same manner as batteries "A".

The electrolytic manganese dioxide, which has been prepared by electrolyzation in a sulfuric acid bath is neutralized by adjusting the concentration in the aqueous sodium hydroxide to contain 1.5 g of sodium hydroxide per 1 kg of the electrolytic manganese dioxide. The neutralized electrolytic manganese dioxide has a sodium content of 0.05% by mass. The neutralized electrolytic manganese dioxide is filtered, dried, and heat-treated at 400° C. for four hours. Then, the heat-treated electrolytic manganese dioxide is stirred and washed with water which is added in a ratio of 20 kg per 1 kg of the heat-treated electrolytic manganese dioxide. After the washing with water, the electrolytic manganese dioxide is centrifuged to remove water, and dried, thus preparing water-washed electrolytic manganese dioxide having a sodium content of 0.03% by mass, and a pH of 4.5 as measured according to JIS-K-1467. Batteries "I" are produced using the water-washed electrolytic manganese dioxide thus obtained, but otherwise in the same manner as batteries "A".

The electrolytic manganese dioxide that has not been neutralized with aqueous sodium hydroxide has a sodium content of 0.01% by mass. This electrolytic manganese dioxide is heat-treated at 400° C. for four hours. The heat-treated electrolytic manganese dioxide is stirred and washed with water which is added in a ratio of 10 kg per 1 kg of the heat-treated electrolytic manganese dioxide. After the washing with water, the electrolytic manganese dioxide is centrifuged to remove water, and dried, thus preparing water-washed electrolytic manganese dioxide. This water-washed electrolytic manganese dioxide has a sodium content of 0.01% by mass, which is the same as before being washed with water, and has a pH of 2.0 as measured according to JIS-K-1467. Batteries "J" are produced using the water-washed electrolytic manganese dioxide thus obtained, but otherwise in the same manner as batteries "A".

The electrolytic manganese dioxide, which has been prepared by electrolyzation in a sulfuric acid bath is neutralized by adjusting the concentration in the aqueous sodium hydroxide to contain 10.0 g of sodium hydroxide per 1 kg of the electrolytic manganese dioxide. The neutralized electrolytic manganese dioxide has a sodium content of 0.50% by mass. The neutralized electrolytic manganese dioxide is filtered, dried, and heat-treated at 400° C. for four hours. Then the heat-treated electrolytic manganese dioxide is stirred and washed with water which is added in a ratio of 40 kg per 1 kg of the heat-treated electrolytic manganese dioxide. After the washing with water, the electrolytic manganese dioxide is centrifuged to remove water, and dried, thus preparing water-washed electrolytic manganese dioxide having a sodium content of 0.20% by mass, and a pH of 7.0 as measured according to JIS-K-1467. Batteries "K" are produced using the water-washed electrolytic manganese dioxide thus obtained, but otherwise in the same manner as batteries "A".

Five of each of the batteries "A" to "K" thus produced are subjected to discharge at 500 mA at room temperature. The other five of each of the batteries "A" to "K" are subjected to constant-resistance discharge at 300 kgΩ at room temperature and measured for internal resistance one year later. Table 1 below shows the sodium contents of the electrolytic manganese dioxides before and after being washed with water, the pH of the electrolytic manganese dioxides after being washed with water. Note that each value indicates a mean value of five batteries.

TABLE 1

| | sodium content (% by mass) | | | discharge at | internal resistance one year later when discharged |
|---|---|---|---|---|---|
| | before washing | after washing | pH | 500 mA (note 1) (initial) | at 300 kΩ (note 2) (Ω) |
| batteries A | 0.10 | 0.05 | 5.0 | 100 | 0.2 |
| batteries B | 0.30 | 0.20 | 5.0 | 98 | 0.2 |
| batteries C | 0.40 | 0.20 | 7.0 | 98 | 0.2 |
| batteries D | 0.15 | 0.05 | 7.0 | 100 | 0.2 |
| batteries E | 0.20 | 0.10 | 6.0 | 100 | 0.2 |
| batteries F | 0.40 | 0.25 | 6.0 | 94 | 0.2 |
| batteries G | 0.15 | 0.10 | 4.5 | 100 | 0.6 |
| batteries H | 0.20 | — | 4.5 | 98 | 0.6 |
| batteries I | 0.05 | 0.03 | 4.5 | 100 | 0.6 |
| batteries J | 0.01 | 0.01 | 2.0 | 100 | 1.0 |
| batteries K | 0.50 | 0.20 | 7.0 | 98 | 0.2 |

(note 1) indexes when the discharge time of batteries "A" at 500 mA (an end-of-discharge voltage of 2.0 V) is 100
(note 2) values measured at a sinusoidal alternating current of 1 kHz by supplying a current of 0.1 mA According to Table 1, the batteries "F" have a low initial discharge performance. The reason for this is considered that the high sodium content of the electrolytic manganese dioxide used as the positive electrode active material causes the sodium contained in positive electrode 1 to be deposited on negative electrode 2 and to form a resistance film thereon, thereby impeding the discharge reaction.

Table 1 also shows that the batteries "G", "H", "I", and "J" have excellent initial discharge characteristics, but have high internal resistances when continued to be discharged at 300 kΩ for one year, indicating that their long-term discharge performance are poor. The reason for this is considered as follows. Since the electrolytic manganese dioxides used as the positive electrode active material have pHs of less than 5, the acid generated from the reaction between sulfuric acid components remaining in the electrolytic manganese dioxide and a small amount of water in the batteries causes manganese ions to elute from positive electrode 1, and to be deposited on negative electrode 2, thus forming a resistance film.

In contrast, the batteries "A" to "E" and "K" have low internal resistances when continued to be discharged at 300 kΩ for one year, indicating their excellent long-term discharge performance as well as excellent initial discharge performance. The batteries "K", however, require more water than batteries "A" to "E" because the washing is performed using 40 kg of water per 1 kg of the heat-treated electrolytic manganese dioxide. In conclusion, in order to save water for the washing, the sodium content of the neutralized electrolytic manganese dioxide is preferably 0.1 to 0.4% by mass.

The above description shows cylindrical batteries having a spiral-wound electrode assembly, but the present invention is not limited to such an electrode assembly or battery shape. The present invention is also applicable to batteries with stacked electrodes or prismatic or coin shaped batteries.

INDUSTRIAL APPLICABILITY

The sodium-neutralized electrolytic manganese dioxide according to the present invention can be a positive electrode active material for lithium primary batteries excellent in both initial discharge characteristics and long-term discharge characteristics, thus being suitable for electrical devices which are required to have a long life.

The invention claimed is:

1. A method for producing electrolytic manganese dioxide for lithium primary batteries, the method comprising:
   preparing neutralized electrolytic manganese dioxide by neutralizing electrolytic manganese dioxide with sodium hydroxide, the electrolytic manganese dioxide being electrosynthesized in an acid electrolytic bath; and
   washing the neutralized electrolytic manganese dioxide with water and drying the washed neutralized electrolytic manganese dioxide to prepare water-washed electrolytic manganese dioxide having a sodium content of 0.05 to 0.2% by mass, and a pH of 5 to 7 as measured according to JIS-K-1467, wherein an amount of water in the washing the neutralized electrolytic manganese dioxide is adjusted so that the water-washed electrolytic manganese dioxide after drying has a pH of 5 to 7 as measured according to JIS-K-1467.

2. The method of claim 1, wherein
   the neutralized electrolytic manganese dioxide before washing has a sodium content of 0.1 to 0.4% by mass.

3. The method of claim 1, further comprising:
   drying the neutralized electrolytic manganese dioxide before washing,
   wherein the dried neutralized electrolytic manganese dioxide is washed when preparing the water-washed electrolytic manganese dioxide.

4. The method of claim 3, wherein
   the dried neutralized electrolytic manganese dioxide before washing has a sodium content of 0.1 to 0.4% by mass.

5. The method of claim 1, wherein the amount of water is 5 kg to 40 kg per 1 kg of the neutralized electrolytic manganese dioxide.

6. The method of claim 3, wherein an amount of water in washing the dried neutralized electrolytic manganese dioxide is adjusted so that the water-washed electrolytic manganese dioxide after drying has a pH of 5 to 7 as measured according to JIS-K-1467.

7. The method of claim 3, wherein the amount of water is 5 kg to 40 kg per 1 kg of the dried neutralized electrolytic manganese dioxide.

8. The method of claim 4, wherein an amount of water in washing the dried neutralized electrolytic manganese dioxide is adjusted so that the water-washed electrolytic manganese dioxide after drying has a pH of 5 to 7 as measured according to JIS-K-1467.

9. The method of claim 4, wherein the amount of water is 5 kg to 40 kg per 1 kg of the dried neutralized electrolytic manganese dioxide.

* * * * *